March 2, 1965  R. B. HUGHES  3,171,625
FILTER PAPER HOLDER
Filed July 15, 1963  2 Sheets-Sheet 2
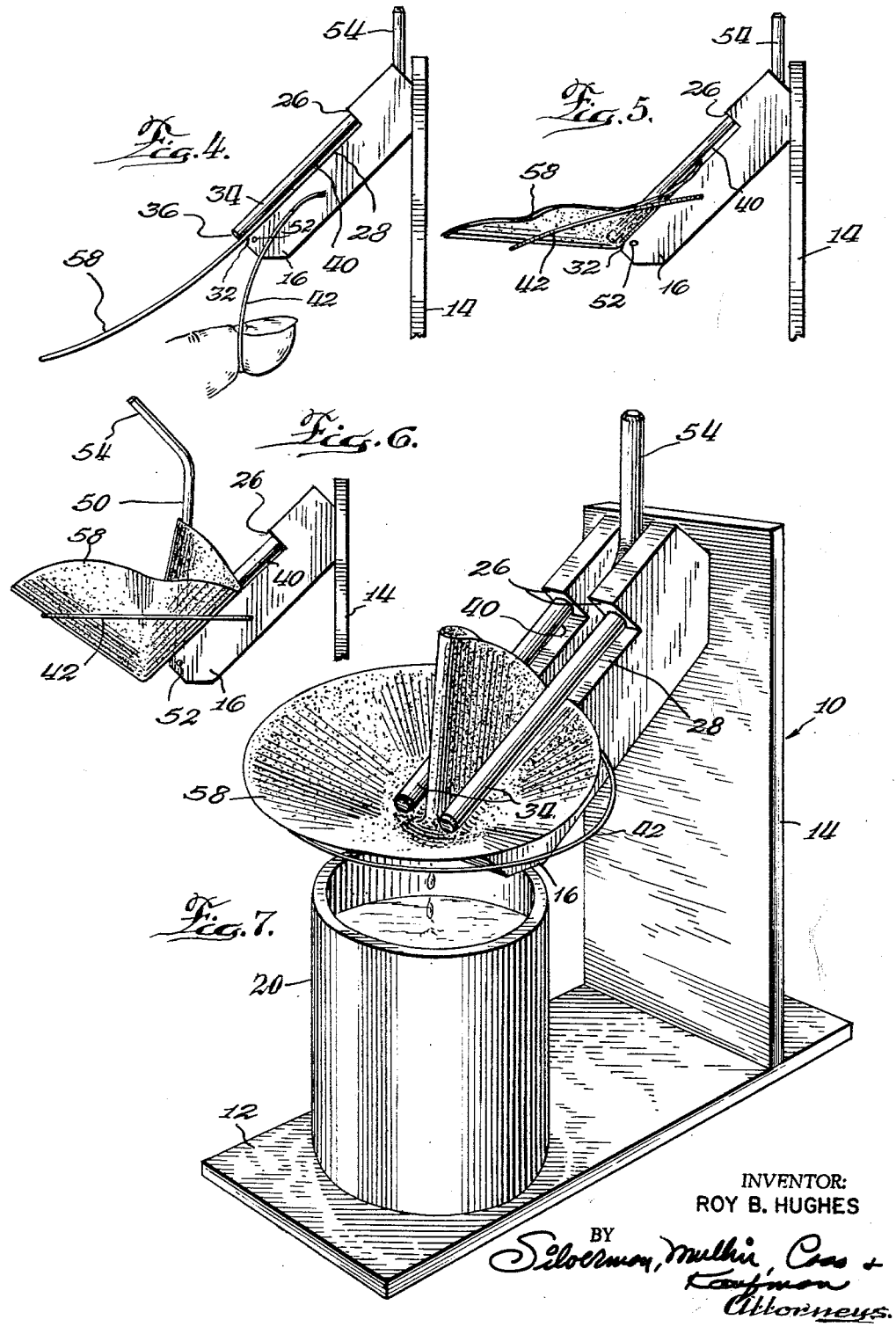
INVENTOR:
ROY B. HUGHES
BY
Silverman, Mulkin, Cass &
Kaufman
Attorneys.

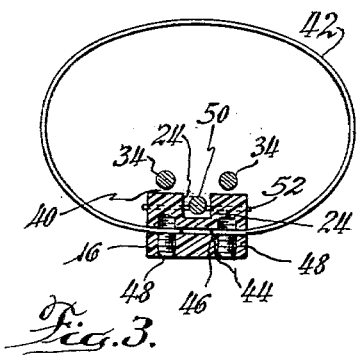
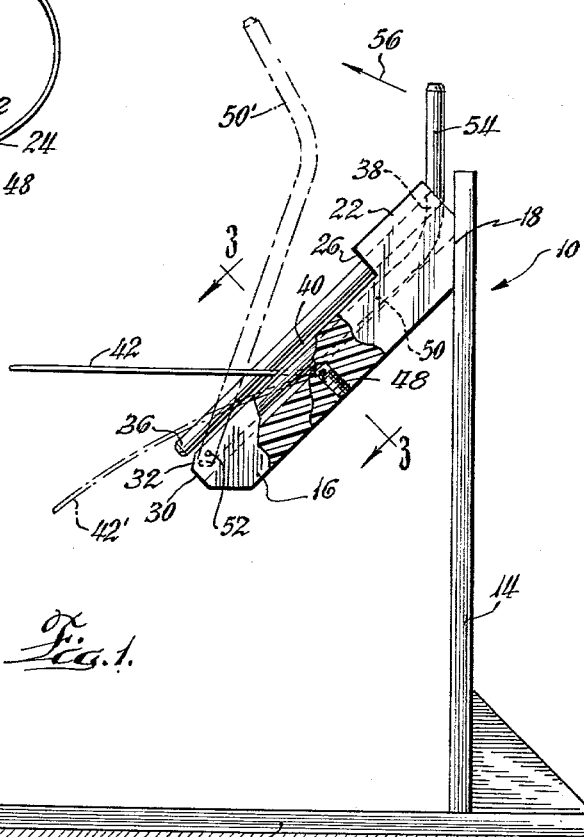
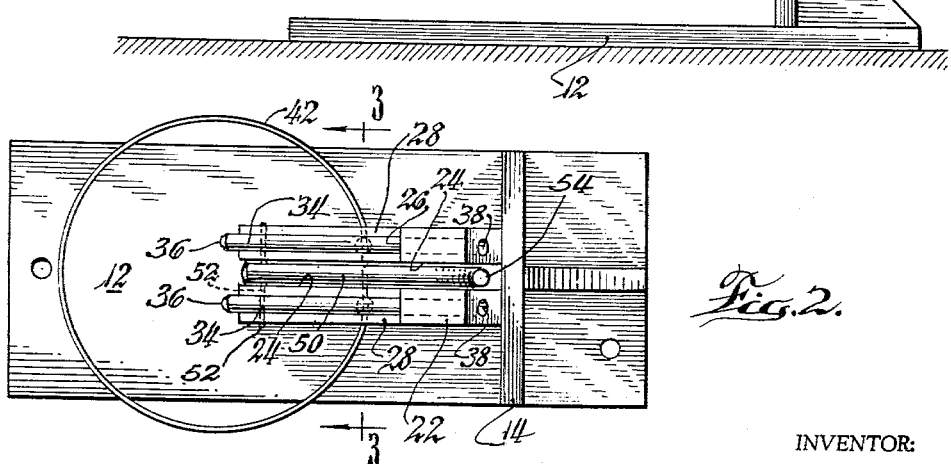

United States Patent Office 3,171,625
Patented Mar. 2, 1965

3,171,625
FILTER PAPER HOLDER
Roy B. Hughes, Aberdeen, Wash., assignor to Coulter Electronics Sales Co., Hialeah, Fla., a corporation of Illinois
Filed July 15, 1963, Ser. No. 294,901
6 Claims. (Cl. 248—94)

This invention relates generally to apparatus for use in handling filter paper and more particularly, is concerned with a filter paper holder.

Practically every chemical laboratory and most of the bacteriological, biological, blood, food and the like laboratories use the familiar filter paper in conjunction with a funnel for filtering liquids. Commonly filter paper consists of a porous disc of suitable paper which is formed into a cone and fitted into a glass or similar funnel which, in turn, is mounted on a stand so that the liquid may pass from the filter into the funnel and drain off into a suitable receptacle.

This invention provides apparatus in which a piece of filter paper is supported in a conical configuration without the need for a funnel. Many advantages attach to such an arrangement, including: the elimination of the funnel; elimination of folding and manipulating the filter paper and inserting it into the funnel; provision of a free flowing surface not backed up by the wall of a funnel for example; the elimination of excessive contamination during manipulation of the filter paper; and other advantages which will become apparent as the description of the invention proceeds.

Accordingly it is a principal object of the invention to provide a filter paper holder by means of which a piece of filter paper may be inserted, formed into a conical configuration and supported for use.

Other objects of the invention are concerned with the provision of such an apparatus which is economical, simple, effective and easy to use.

A preferred embodiment is illustrated in the drawings and described in detail hereinafter, such as to enable those skilled in the art to understand the invention and practice the same.

In the drawings:

FIG. 1 is a side elevational view of the filter paper holder of the invention, the same being shown without a member of filter paper in place, portions being shown in section.

FIG. 2 is a top plan view of the same.

FIG. 3 is a sectional view of the same taken generally along the line 3—3 of FIG. 1 in the direction indicated.

FIGS. 4, 5 and 6 are fragmentary side elevational views showing various steps in arranging a filter paper member for use in filtering a liquid.

FIG. 7 is a perspective view showing the apparatus together with a filter paper member in place ready for use.

Basically, the invention comprises a standard having a laterally arranged arm secured thereto spaced from the bottom of the standard. The arm has a pair of fingers cooperating with a surface of the arm to provide a slot within which a filter paper member is to be disposed, and a resilient wire ring is mounted relative to the fingers to cooperate therewith in supporting the filter paper member while the same is in a conical configuration. A movable lever normally straddled by the fingers is capable of movement upwardly and between the fingers to engage an edge of the filter paper member to form the same into a fold while thereby pulling the filter paper member into a conical configuration. Thereafter the lever is moved back to its original position and the filter paper member is supported for use with any suitable receptacle disposed below the same.

Coming now to the details, the drawings illustrate a simple form of the apparatus which was originally intended for use in haematology laboratories but which is obviously capable of use anywhere that filter paper is used.

The apparatus is designated generally by the reference character 10 and comprises a base member 12 having a vertical standard 14 secured thereto and suitably braced. A lateral arm 16 is secured at 18 to the standard spaced above the base 12 to enable a beaker, for example, to be mounted on the base as shown in FIG. 7, the beaker being designated 20. Conveniently the base and standard 14 as well as the lateral arm 16 may be formed of plastic, and the securement at 18 may be by cement or other suitable adhesive.

The lateral arm extends from its point of securement 18 downwardly and forwardly of the base 12 and is provided with an enlarged formation 22 adjacent its point of securement. A groove 24 is formed in the center of the arm 16 along its length thereby dividing the enlarged formation 22 into two parts, each of which presents a forwardly facing surface 26 and thereby forming a pair of elongate tracks 28 between the surfaces 26 and the lower left or free end 30 of the arm 16. At least the upper portion of said end is beveled as at 32 for a purpose presently to be described, and of course since the groove 24 extends throughout the entire length of the arm 16, the beveled end 32 in actuality comprises a pair of such beveled formations disposed at the ends of the respective tracks 28.

Each of the halves of the enlarged formation 22 has a finger 34 secured therein in a suitable socket which may be a hole formed in each of the halves of the enlarged portion 22. As seen in the drawings, the fingers 34 extend slightly beyond the tracks 28 respectively as shown at 36 by virtue of the beveled formations 32, the said fingers being supported in the sockets 38 and extending out forwardly and downwardly from the faces 26. It is important that these fingers 34 be sufficiently spaced above the tracks 28 to provide a slot 40 within which the filter paper will be received, as explained.

The fingers 34 preferably are formed of stainless steel wire for ease of cleaning and to avoid contamination due to chemical reaction with the substances being filtered.

Between the ends of the arm 16 and approximately at the center thereof and disposed toward the bottom of the said arm, there is secured a resilient wire loop 42. This loop has its ends engaged in the opposite ends of a passageway 44 cut through the body of the arm 16 and economically the said ends which are designated 46 in FIG. 3, may be held in such pasasgeway 44 by friction but such connection must be quite rigid. In the particular apparatus illustrated, set screws 48 in suitable threaded holes secure the loop 42 in position. The loop, as will be noted, has its normal disposition horizontal with the relationship between loop 42 and fingers 34 being such that the ends 36 terminate in the general vicinity of the axis of the loop which carries them substantially below the plane thereof.

In use, the loop will preliminarily be flexed downwardly as indicated by the broken lines 42′ in FIG. 1, this being accomplished either by the user's finger or by a combination of the user's finger and the filter paper. In other words, the user may press down on the loop with his finger and insert the filter paper with his other hand or may grasp the filter paper in one hand and press down on the loop while inserting the filter paper into the slot 40 at the same time.

Continuing with the detailed description of the apparatus, a lever 50 is disposed in the groove 24 with its lower left-hand end, as viewed in FIG. 1, pivotally secured by any suitable means 52 and its opposite end bent upwardly to form a handle at 54 which extends out of the groove and upwardly past the standard 14 so that the user may readily grasp the same. It is intended that the lever 50 will be moved by pulling forward on the handle 54 as indicated by the arrow 56 to the general position indicated by the broken line 50' in FIG. 1 and in solid lines in FIG. 6. In use, the user pushes the loop 42 downwardly to flex the same away from the entrance to the slot 40 which is defined by the beveled ends 32 and the ends 36. The filter paper member 58 is inserted edgewise into the slot 40 between the fingers 34 and the tracks 28. The filter paper member 58 is approximately aligned co-axially with the loop 42 and the loop 42 released thereby initially applying pressure to the bottom of the filter paper member and biasing the same generally in an upwardly concave configuration. The reason for this is that the member 58 held by rigid fingers 34 opposes the return of the loop 42 to its normally horizontal position, thereby also engaging the filter paper member 58 firmly in the slot 40.

The condition just described is generally illustrated in FIG. 5, and it should be pointed out that the exact configuration will depend upon the dimensions of the apparatus, the filter paper, the amount of tension in the wire loop 42, and the like. The user may adjust the filter paper member 58 while it is in the condition shown in FIG. 5, if desired.

The next step in forming the usual conical configuration is to partially pull the lever 50 out of the groove 24 upwardly and between the fingers 34. This movement engages one edge of the filter paper member 58 and applies tension to the surface of the filter paper member pulling the same inwardly of the slot 40 from opposite sides thereof under the fingers 34, and since this tension extends substantially in the plane of the filter paper member, the result is that the same is pulled into a conical configuration with the apex of the cone at approximately the ends 36 and the base of the cone extending upward. While the wire loop 42 is disposed to support the resulting conical configuration as best shown in FIG. 7, the fingers 34 engaging the filter paper member between themselves and the tracks 28 actually hold the filter paper member independently of the loop. The loop prevents the filter paper member from being pushed off the fingers and also serves as a support during use when the conical configuration carries liquid and may lose some of its stiffness through absorption of the liquid.

The reference to "conical configuration" herein is not intended to be limited to the true geometric cone. As a matter of fact, the exact configuration is more like a cone having an apex in the form of a fold, caused by the ends of the fingers 34. One may think of the familiar folded paper water cup that opens to a general conical configuration not too dissimilar from that produced by the apparatus described herein.

After the filter paper member has been used, the same may be pushed downwardly through the loop or the loop may be flexed downwardly and the member slipped out from under the fingers or the user may grasp the apex or end in the fingers and pull the entire filter paper member out of engagement with the loop and fingers.

It will be seen there is a minimum of handling of the filter paper member, that the conical configuration is formed in a simple manner, that the apparatus is made up of a small number of easily formed pieces and that it eliminates the use of a funnel in filtering operations, as well as achieving other advantages.

What it is desired to secure by Letters Patent of the United States is:

1. A filter paper holder comprising a standard, support means connected to said standard and extending laterally and downwardly therefrom, means on said support means forming a pair of parallel slots for receiving a filter paper member therein, a folder lever adapted to move vertically between the slots to pull a fold of said filter paper member up between the slots to form thereby a generally conical configuration therefrom, and means also connected to said support means to hold the filter paper member in its said conical configuration.

2. A holder as claimed in claim 1 in which said last means comprises a resilient loop disposed to have its plane intersecting said slots, and with the entrance to said slots below the said plane.

3. A holder as claimed in claim 2 in which said resilient loop is rigidly connected to said support means and adapted to be flexed downward to clear the entrance to said slots.

4. A holder as claimed in claim 1 in which said support means is a rigid arm and said slot forming means comprise a pair of fingers spaced above the surface of said arm on the opposite side of a groove formed in said arm.

5. A filter paper holder which comprises a vertical standard having a laterally and downwardly extending arm spaced above the bottom of said standard, a pair of fingers secured to said arm spaced apart, and a pair of tracks formed on said arm and arranged parallel with said fingers and spaced therefrom but vertically aligned whereby to provide a two-part slot defining a slanted plane, a lever swingably supported on the end of said arm and disposed below said plane and between said fingers and having a handle whereby said lever may be moved upwardly between said fingers to cut said plane, and a resilient loop secured to said arm between the ends thereof being disposed normally horizontally and the fingers terminating below the loop and at substantially the center thereof, whereby a filter paper member may be inserted from one edge thereof into said slot with the loop flexed away from the fingers, the loop released, and the lever pulled part way out between the fingers to cause the filter paper member to assume a substantially conical configuration above the loop.

6. A holder as claimed in claim 5 in which the fingers are slightly longer than the arm, and the arm is beveled at the track ends to provide a pilot to said slot.

References Cited by the Examiner
UNITED STATES PATENTS

| | | | |
|---|---|---|---|
| 62,741 | 3/67 | Gano | 248—97 |
| 945,645 | 1/10 | Vonderahe | 248—99 |
| 1,548,986 | 8/25 | Donovan | 248—99 |
| 1,868,269 | 7/32 | Beadle | 248—94 |

FRANK L. ABBOTT, *Primary Examiner.*